(No Model.)
W. A. SHEPARD.
METHOD OF AND APPARATUS FOR PREPARING FERTILIZERS.
No. 546,716. Patented Sept. 24, 1895.
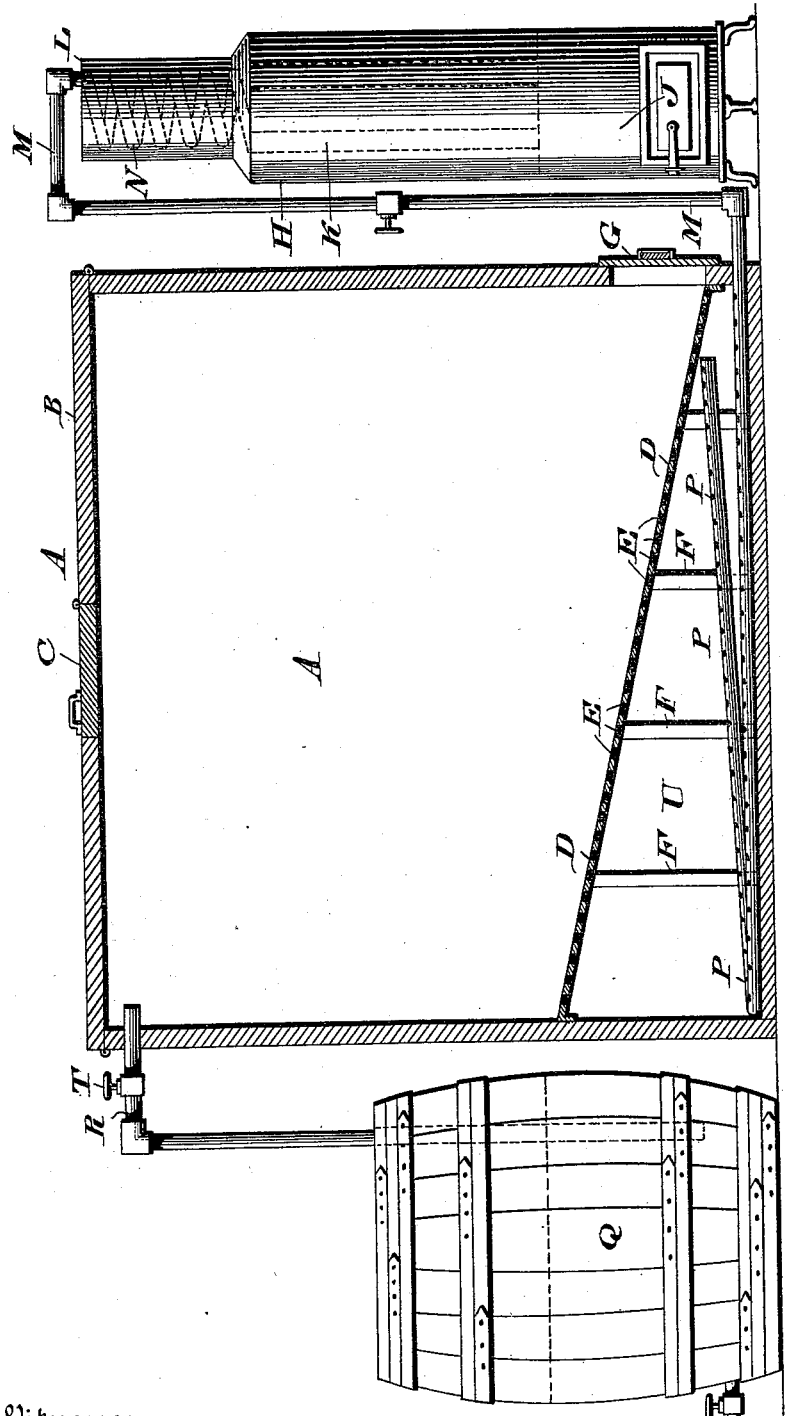
Witnesses
P. F. Nagle.
L. Douville.
Inventor:
William Albert Shepard.
By his Attorney
John A. Wiedersheim.

UNITED STATES PATENT OFFICE.

WILLIAM ALBERT SHEPARD, OF NEW YORK, N. Y.

METHOD OF AND APPARATUS FOR PREPARING FERTILIZERS.

SPECIFICATION forming part of Letters Patent No. 546,716, dated September 24, 1895.

Application filed August 14, 1894. Serial No. 520,251. (No model.)

*To all whom it may concern:*

Be it known that I, WILLIAM ALBERT SHEPARD, a citizen of the United States, residing in the city, county, and State of New York, have invented a new and useful Improvement in Methods of and Apparatus for Preparing Fertilizers from Excrement, which improvement is fully set forth in the following specification and accompanying drawing.

My invention consists of an improved method of preparing fertilizers from excrement, &c., in which the same is placed in an air-tight receptacle and subjected to a current of superheated steam, whereby every portion of the said excrement is affected and chemically changed by the said steam, the ammoniacal and other gases evolved by my process being collected in a suitable receptacle and the excrement after treatment being adapted to be combined with other ingredients for utilization as a fertilizer.

My invention also consists of a novel apparatus whereby the above process may be effected cheaply and quickly, all as will be hereinafter set forth.

The drawing represents a diagrammatic view of an apparatus embodying my invention.

Referring to the drawing, A designates an air-tight tank, made of wood or other suitable material, which may rest upon any suitable support.

B designates a cover for the tank, which may be hinged thereto and form a tight joint therewith, the said cover being also provided with an inspection-opening C, which is utilized when it is desired to examine the contents of the tank.

D designates a sloping false bottom, preferably made of thick sheet-iron, which is perforated with numerous fine holes E and may be supported in any desired manner within the tank. In the present instance I have employed blocks of wood F, of different lengths, which rest upon the true bottom of the tank, the space between the false bottom D and the true bottom constituting a steam-chamber U.

G designates a door in the rear of the tank, which is located adjacent to the lowest part of the false bottom, through which the contents of the tank can be removed when desired, the said door making a tight joint with the tank.

H designates a steam-boiler located at a convenient point near the tank, which may be of any desired construction; but in the present instance I employ a vertical boiler having the fire-box J, fire-tubes K, stack L, and steam-outlet pipe M, which has a coil N in its stack, so that the steam will be highly superheated by the products of combustion as they leave the boiler. The pipe M enters the tank below the perforated false bottom D, beneath which it terminates in the form of perforated coils or convolutions P, so that the superheated steam will be caused to pass up through and thoroughly permeate the entire contents of the tank. At the other end of the tank A is placed the closed receptacle Q, which is to be always partially full of water, into which leads the pipe R, having a valve T therein, said pipe extending from the top of the tank A to nearly the bottom of the receptacle or barrel Q and conveying all the ammoniacal and other enriching gases thereto from the tank A, the gases being taken up by the water, which can afterward be drawn off through the cock S and conducted to a mixing-cylinder, (not shown,) which may be of any desired construction and be provided with suitable mechanism for thoroughly mixing the composition.

The operation is as follows: The excrement, &c., is placed in the tank and the lid tightly fastened down and the valve T closed. Steam having been admitted to the interior of the tank below the false bottom for a short time thoroughly permeates the mass, the valve T is opened, and the ammoniacal and other gases generated pass through the pipe R into the receptacle or barrel Q and are taken up by the water therein, which is afterward conducted to a mixing-cylinder. (Not shown.) After the contents of the tank have been once treated they are dumped from the sloping false bottom out of the door G. The tank can then be filled and the operation repeated. If desired, the above device can be mounted on a movable truck, the work of loading, quickly cooking or steaming the contents of the tank, and unloading the same at any desired point into mixing-boxes, where the cooked material is prepared for market, being continuously carried on. The cooked material can be mixed in varying proportions with gas-lime, slaked lime, or quicklime for various purposes. For a top dressing for lawns, &c., I mix twenty per cent. of gas-lime with the cooked excrement. For cereals I employ fifteen per cent. of slaked lime. For potatoes, beets, turnips, &c., I use ten per cent. of quicklime, and for other garden truck, flowers, &c., I use five per cent. of quicklime, and for fertilizing fruit-trees, &c., I mix fifteen per cent. of slaked lime with the cooked excrement. The above proportions of lime may be slightly increased for plowed grounds where the soil is light and decreased when the soil is heavy, the effect of which will be evident.

Having thus described my invention, what I claim as new, and desire to secure by Letters Patent, is—

1. The method of preparing fertilizer from excrement, which consists in passing superheated steam through the same in an air tight chamber to separate and remove ammoniacal and other offensive gases therefrom, condensing said gases in water, removing the solid matters, and mixing the dehydrated and cooked material with lime, substantially as described.

2. An apparatus for the purpose set forth, consisting of an air tight tank having a lid and door, an inclined perforated false bottom leading to said door, a superheated steam supply leading into said tank below said false bottom, a condenser consisting of a closed receptacle with a discharge pipe, and a pipe leading from the upper part of said tank into the upper part of said receptacle, and extending to the bottom of the same, said parts being combined substantially as described.

3. An apparatus for the purpose set forth, consisting of the tank A having the lid B with the inspection opening C therein, the discharge door G, the inclined perforated false bottom D leading to said door, the fire box J with the stack L, the pipe M with the coil N in said stack, and the perforated convolutions P in said tank below said false bottom, the closed receptacle Q adapted to contain water, and the pipe R leading from the upper part of the said tank into and toward the bottom of said receptacle Q, said pipe having a cock T, and said receptacle having a cock S, said parts being combined substantially as described.

WILLIAM ALBERT SHEPARD.

Witnesses:
JOHN A. WIEDERSHEIM,
A. P. JENNINGS.